US011190367B2

United States Patent
Meng et al.

(10) Patent No.: US 11,190,367 B2
(45) Date of Patent: Nov. 30, 2021

(54) MULTICAST FORWARDING METHOD AND MULTICAST ROUTER

(71) Applicant: HUAWEI TECHNOLOGIES CO., LTD., Guangdong (CN)

(72) Inventors: Rui Meng, Beijing (CN); Chuang Wang, Beijing (CN); Yong Huang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 70 days.

(21) Appl. No.: 16/830,864

(22) Filed: Mar. 26, 2020

(65) Prior Publication Data
US 2020/0228356 A1 Jul. 16, 2020

Related U.S. Application Data

(63) Continuation of application No. PCT/CN2018/104423, filed on Sep. 6, 2018.

(30) Foreign Application Priority Data

Sep. 27, 2017 (CN) .......................... 201710892283.9

(51) Int. Cl.
*H04L 12/18* (2006.01)
*H04L 12/741* (2013.01)
(52) U.S. Cl.
CPC .............. *H04L 12/18* (2013.01); *H04L 45/74* (2013.01)
(58) Field of Classification Search
CPC ..... H04L 45/16; H04L 12/18; H04L 12/1854; H04L 45/74; H04L 12/1886; H04L 45/745
See application file for complete search history.

(56) References Cited

U.S. PATENT DOCUMENTS 9,344,359 B1 5/2016 Tiruveedhula et al.
2008/0095161 A1 4/2008 Xu
(Continued)

FOREIGN PATENT DOCUMENTS

CN 1595879 A 3/2005
CN 1747447 A 3/2006
(Continued)

OTHER PUBLICATIONS

B. Fenner: Protocol Independent Multicast—Sparse Mode (PIM-SM): Protocol Specification (Revised), RFC7761, Mar. 2016, total 137 pages.

*Primary Examiner* — Mansour Oveissi
(74) *Attorney, Agent, or Firm* — Womble Bond Dickinson (US) LLP

(57) ABSTRACT

This application discloses a multicast forwarding method and a multicast router. The method includes: listening to, by a first multicast router, a plurality of unicast packets passing through the first multicast router, and determining a set of unicast packets that are from a same upstream multicast router and that belong to a same unicast stream; when determining that destination addresses of at least two unicast packets in the unicast packet set are different, sending, by the first multicast router, a prune message to the upstream multicast router; and sending, by the first multicast router, the received unicast packets with the multicast identifier to the destination devices corresponding to the destination address group. The method is used to provide a new multicast method, so as to implement multicast functions of some routers in an existing unicast network architecture.

13 Claims, 9 Drawing Sheets

(56) References Cited

U.S. PATENT DOCUMENTS

| | | |
|---|---|---|
| 2008/0205397 A1 | 8/2008 | Xu |
| 2009/0052448 A1 | 2/2009 | Ramakrishnan et al. |
| 2015/0055652 A1 | 2/2015 | Yong et al. |
| 2015/0201312 A1 | 7/2015 | Tjahjono et al. |
| 2015/0229485 A1 | 8/2015 | Lee et al. |
| 2016/0173400 A1* | 6/2016 | Banavalikar ............ H04L 45/24 370/235 |
| 2016/0315848 A1* | 10/2016 | Weinstein ............... H04L 45/16 |
| 2017/0012859 A1 | 1/2017 | Ye et al. |
| 2017/0078188 A1 | 3/2017 | Allan |
| 2017/0317841 A1 | 11/2017 | Xu |

FOREIGN PATENT DOCUMENTS

| | | | |
|---|---|---|---|
| CN | 1859255 | A | 11/2006 |
| CN | 1863147 | A | 11/2006 |
| CN | 1905530 | A | 1/2007 |
| CN | 1937610 | A | 3/2007 |
| CN | 101394358 | A | 3/2009 |
| CN | 101764756 | A | 6/2010 |
| CN | 102035729 | A | 4/2011 |
| CN | 102833082 | A | 12/2012 |
| CN | 103209132 | A | 7/2013 |
| CN | 103209134 | A | 7/2013 |
| CN | 104954265 | A | 9/2015 |
| CN | 105871565 | A | 8/2016 |
| CN | 106878180 | A | 6/2017 |
| JP | 2008060631 | A | 3/2008 |
| JP | 4181513 | B2 | 11/2008 |
| WO | 2017141076 | A1 | 8/2017 |

* cited by examiner

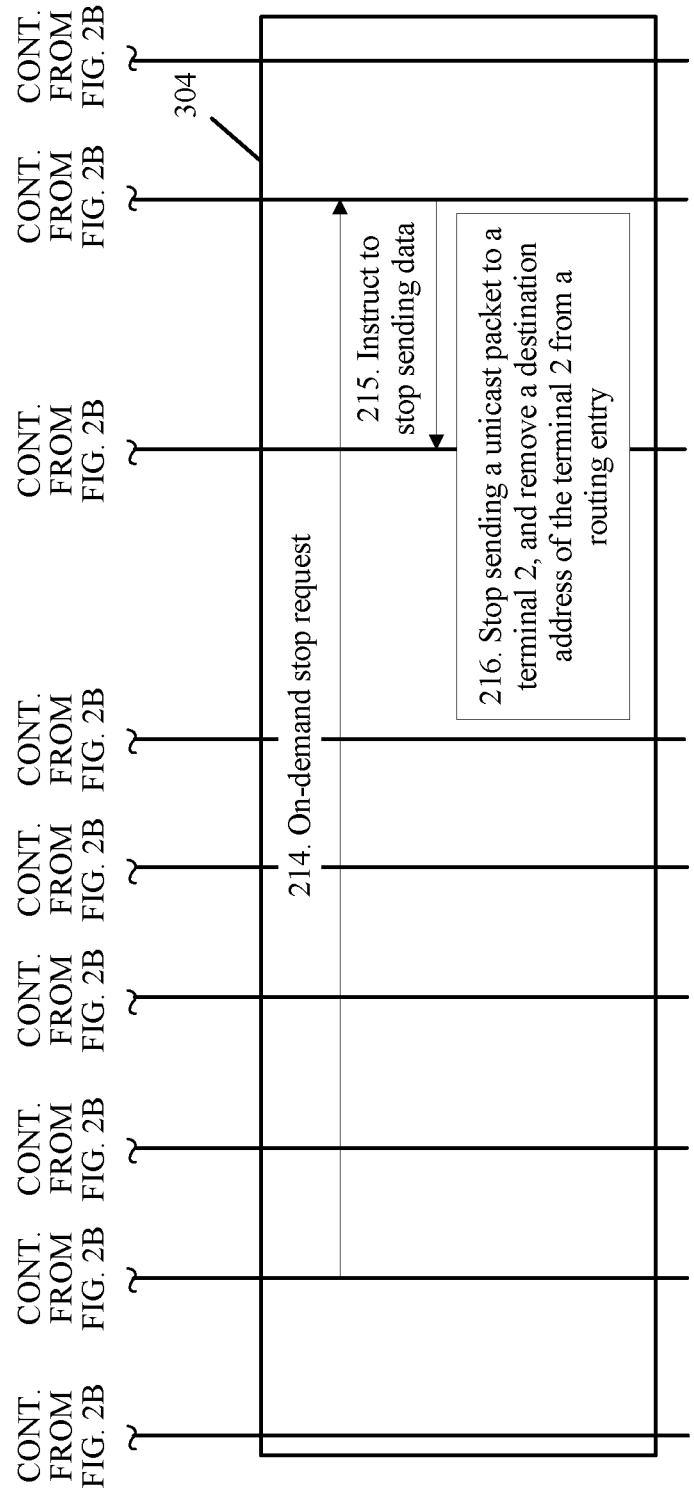

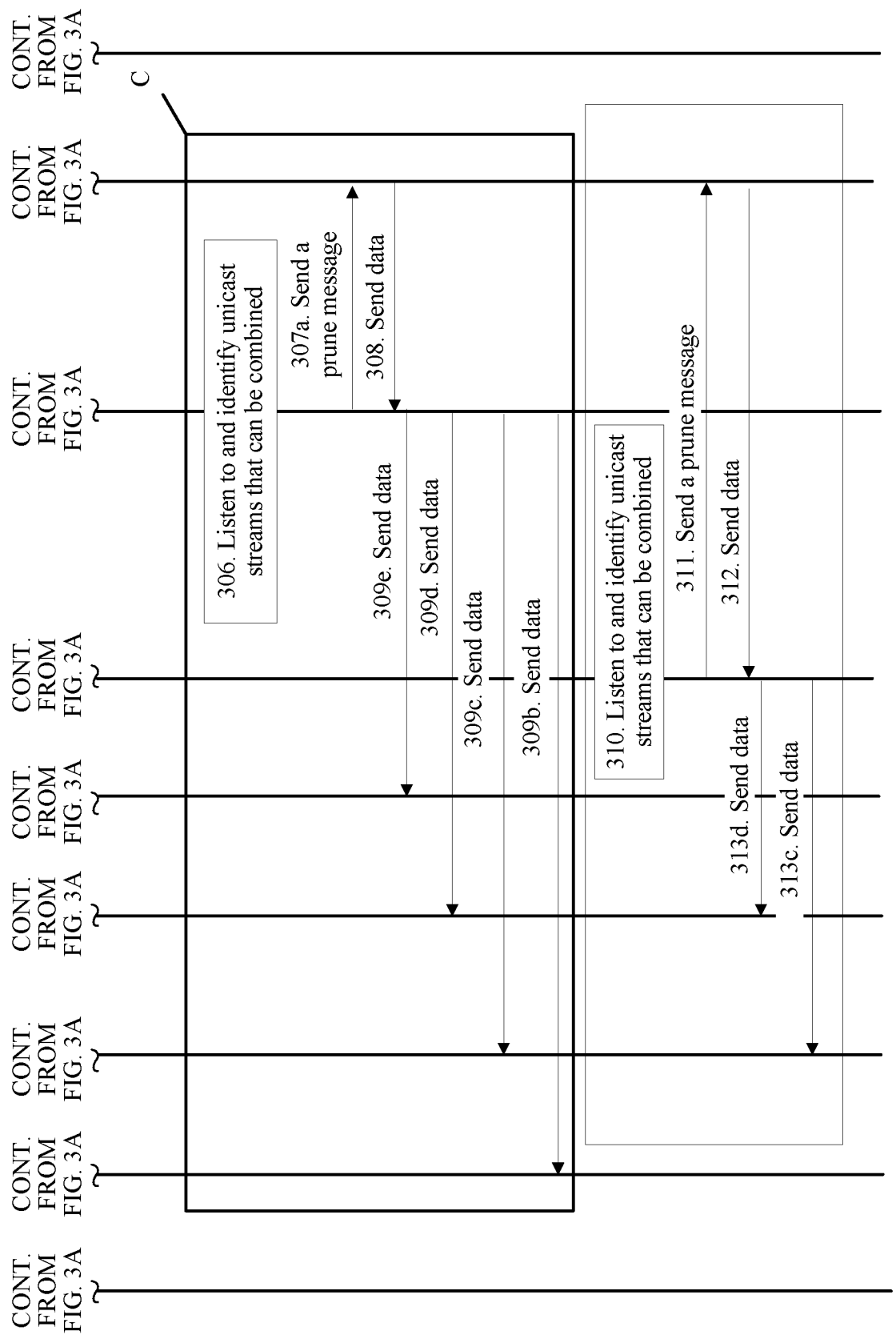

MULTICAST FORWARDING METHOD AND MULTICAST ROUTER

CROSS-REFERENCE TO RELATED APPLICATIONS

This application is a continuation of International Application No. PCT/CN2018/104423, filed on Sep. 6, 2018, which claims priority to Chinese Patent Application No. 201710892283.9, filed on Sep. 27, 2017. The disclosures of the aforementioned applications are hereby incorporated by reference in their entireties.

TECHNICAL FIELD

This application relates to the field of information technologies, and in particular, to a multicast forwarding method and a multicast router.

BACKGROUND

An implementation of Internet Protocol (IP) network communication is unicast, which is characterized by transmitting one message to one receiver once; and another implementation is broadcast, which is characterized by transmitting one message to all receivers in a subnet once. When there are a plurality of receivers in a network, the unicast manner may cause generation of a plurality of copies of a same message in the IP network, and a network resource and a server resource are repeatedly occupied. Consequently, transmission efficiency is low. However, different subnets cannot be covered in the broadcast manner. Otherwise, a broadcast storm is triggered. Therefore, a multicast transmission mode of "transmitting one message to a plurality of receivers once" emerges.

IP multicast means that a multicast routing entry is established between a receive end and a multicast source hop by hop by using a multicast routing protocol, and a tree-like structure (namely, a multicast distribution tree) using the multicast source as a root and using a receive end as a leaf is finally constructed. A multicast packet is copied on each multicast router from the root node to the leaf, and ends at a terminal. The Protocol Independent Multicast-Sparse Mode (PIM-SM) Protocol is a multicast routing protocol currently well recognized. However, the PIM-SM protocol still has various disadvantages. For example, all routers in an IP multicast network need to support the PIM-SM protocol, and once a router that is running the PIM-SM breaks down, a multicast service of a terminal connected to a branch tree of the router cannot be automatically recovered.

SUMMARY

In view of this, this application provides a multicast forwarding method and a multicast router, so as to provide a new multicast method, thereby implementing multicast functions of some routers in an existing unicast network architecture.

According to a first aspect, an embodiment of this application provides a multicast forwarding method, and the method includes: listening to, by a first multicast router, a plurality of unicast packets passing through the first multicast router, and determining a set of unicast packets that are from a same upstream multicast router and that belong to a same unicast stream; when determining that destination addresses of at least two unicast packets in the unicast packet set are different, sending, by the first multicast router, a prune message to the upstream multicast router; and sending, by the first multicast router, a received unicast packet with the multicast identifier to destination devices corresponding to the destination address group.

An objective of this method is: Once a multicast router on a branch tree of a communications network finds, through listening, that destination addresses of unicast packets in the unicast packet set are different, a plurality of same unicast streams corresponding to different destination addresses are combined. In other words, the upstream multicast router is instructed to no longer send the plurality of same unicast streams but send only one unicast stream to a downstream multicast router, and the downstream multicast router distributes the unicast stream to destination devices corresponding to the different destination addresses. Therefore, a multicast function can be implemented in a network when some devices support multicast. In addition, some same unicast streams may be combined when the multicast function is implemented, thereby reducing network bandwidth consumption.

In one embodiment, when the first multicast router determines that destination addresses of at least two unicast packets in the unicast packet set are different, the first multicast router obtains destination addresses of all packets in the unicast packet set, and generates a first multicast routing entry. A source address of the first multicast routing entry is an address of the first multicast router, and the destination address group includes all the destination addresses. In this way, the first multicast router can maintain access or departure of a downstream destination terminal by using the multicast routing entry, to manage a client.

In one embodiment, after the first multicast router generates the multicast routing entry, the first multicast router modifies the received unicast packet with the multicast identifier based on the first multicast routing entry, to obtain a modified unicast packet, and then sends the modified unicast packet to the destination devices corresponding to the destination address group.

A source address of the modified unicast packet is the address of the first multicast router, and a destination address of the modified unicast packet is a destination address in the destination address group and in the first multicast routing entry, so that the first multicast router may distribute, based on the first multicast routing entry, a unicast stream combined by the upstream to different destination devices, thereby implementing the multicast function.

In one embodiment, the first multicast router obtains, through listening, a first message sent by the upstream multicast router, where the first message carries the multicast identifier and a first target address, and is used to indicate that a destination device corresponding to the first target address stops receiving a unicast packet with the multicast identifier.

The first multicast router searches for the first multicast routing entry corresponding to the multicast identifier, and determines that the first target address belongs to the destination address group. The first multicast router removes the first target address from the first multicast routing entry, and stops sending the unicast packet with the multicast identifier to the destination device corresponding to the first target address.

In other words, once obtaining, through listening, an instruction message from an upstream for stopping packet forwarding, the multicast router on the branch tree searches for a multicast routing entry of the multicast router according to a specified rule, so as to remove the destination device from the multicast routing entry. Because the multicast routing entry does not include the destination address, the multicast router stops sending a unicast packet to the destination device.

In another case, assuming that a destination address list is empty after the first multicast router removes a first destination address from the multicast routing entry, the first multicast router instructs the upstream multicast router to stop sending the unicast packet with the multicast identifier to the first multicast router. In other words, if a downstream branch of the first multicast router does not have a destination device that is to forward a packet, an upstream branch does not directly send the combined unicast stream to the first multicast router.

According to a second aspect, an embodiment of this application provides a multicast forwarding method, and the method includes: receiving, by a second multicast router, a prune message from a downstream multicast router; and stopping, by the second multicast router based on the prune message, sending unicast packets with the multicast identifier to destination devices corresponding to the destination address group, and sending the to-be-sent unicast packets with the multicast identifier to the downstream multicast router.

The prune message includes a destination address group determined by the downstream multicast router from all unicast packets in a unicast packet set, the unicast packet set is a set of unicast packets that are obtained by the downstream multicast router by listening to a plurality of unicast packets passing through the downstream multicast router, that are from the second multicast router, and that belong to a same unicast stream, a unicast packet in the unicast stream carries a multicast identifier, and the multicast identifier indicates that the unicast packets in the unicast stream are from a same data source server and are to be sent to destination devices that belong to a same multicast group. Therefore, the second multicast router may combine unicast streams corresponding to the destination address group after receiving the prune message, and therefore only needs to send a combined unicast stream to the downstream multicast router, so as to reduce network bandwidth consumption.

In one embodiment, the second multicast router receives a registration request from the data source server, where the registration request carries IP four-tuple information of a User Datagram Protocol (UDP) session. The second multicast router allocates a multicast group identifier to the UDP session based on the registration request.

The second multicast router sends a registration request response message to the data source server, where the response message carries the multicast group identifier. The second multicast router receives a unicast packet sent by the data source server, where a header of the unicast packet carries the multicast identifier, and the multicast identifier is generated by the data source server based on an address of the data source server and the multicast group identifier.

In other words, the second multicast router further has a function of allocating a multicast identifier to the UDP session of the data source server. In this way, the data source server inserts the multicast identifier into packets, to indicate that the packets are from a same data source and are of a same type, and send the packets to the destination devices of the same multicast group, so that the downstream multicast router listens to the packets, and identifies unicast streams that can be combined.

In one embodiment, the second multicast router receives an on-demand request from a first client, where the on-demand request is used to request to subscribe to the UDP session. The second multicast router generates a second multicast routing entry, where a source address of the second multicast routing entry is an address of the second multicast router, and a destination address of the second multicast routing entry is an address of the first client. In this way, the second multicast router can maintain access and departure of each terminal device, so as to facilitate charging management.

In one embodiment, the second multicast router modifies the received unicast packet with the multicast identifier based on the second multicast routing entry, to obtain a modified unicast packet, where a source address of the modified unicast packet is the address of the second multicast router, and a destination address of the modified unicast packet is the address of the first client. The second multicast router sends the modified unicast packet with the multicast identifier to the first client. The second multicast router modifies the unicast packet, and the modified unicast packet is a multicast packet, so that a multicast function can be implemented.

In one embodiment, the second multicast router receives an on-demand stop request sent by the first client, where the on-demand stop request is used to request to stop subscribing to the UDP session. The second multicast router searches for the second multicast routing entry corresponding to the multicast identifier, and determines that the address of the first client is included in the destination address of the second multicast routing entry.

The second multicast router removes the address of the first client from the second multicast routing entry, and stops sending the unicast packet with the multicast identifier to a destination device corresponding to the address of the first client.

In other words, once receiving the on-demand stop request sent by a client, the second multicast router searches for a multicast routing entry of the second multicast router. If the multicast routing entry exists and the address of the client is in a destination address list, the second multicast router removes the multicast routing entry from the destination address, and subsequently a packet is not sent to the client.

In one embodiment, the second multicast router searches for the second multicast routing entry corresponding to the multicast identifier, and determines that the address of the first client is not included in the destination address of the second multicast routing entry. The second multicast router generates a first message based on the second multicast routing entry, where a source address of the first message is the address of the second multicast router, a destination address of the first message is the address of the first client, and the first message carries the multicast identifier, and is used to notify the downstream multicast router that a destination device corresponding to the first target address stops receiving a unicast packet with the multicast identifier. The second multicast router sends the first message to the downstream multicast router, so that the downstream multicast router stops, after obtaining the first message through listening, sending the unicast packet with the multicast identifier to the first client.

In other words, when determining that a first destination address is not in the multicast routing entry of the second multicast router, the second multicast router sends the first message to the downstream multicast router. In other words, the downstream multicast router is instructed to perform searching, and stop sending a packet to the client.

According to a third aspect, an embodiment of this application further provides a multicast forwarding apparatus, and the apparatus has functions of implementing behavior of a terminal in the method example of the foregoing first aspect. The functions may be implemented by hardware, or may be implemented by hardware by executing corresponding software. The hardware or the software includes one or more modules corresponding to the foregoing functions. In one embodiment, the apparatus includes a listening unit, a determining unit, a sending unit, a receiving unit, and a first multicast router of a method side corresponding to the apparatus. The listening unit is configured to listen to a plurality of unicast packets passing through the listening unit. The determining unit is configured to determine a set of unicast packets that are from a same upstream multicast router and that belong to a same unicast stream, where the unicast packets in the unicast stream carry a same multicast identifier, and the multicast identifier indicates that the unicast packets in the unicast stream are from a same data source server and are to be sent to destination devices that belong to a same multicast group. The sending unit is configured to: when determining that destination addresses of at least two unicast packets in the unicast packet set are different, send a prune message to the upstream multicast router, where the prune message carries a destination address group determined from all the unicast packets in the unicast packet set, the prune message is used to instruct the upstream multicast router to stop sending the unicast packets with the multicast identifier to the destination devices corresponding to the destination address group, and send the to-be-sent unicast packets with the multicast identifier to the first multicast router. The sending unit is configured to send the unicast packet with the multicast identifier received by the receiving unit to the destination devices corresponding to the destination address group.

In one embodiment, the multicast forwarding apparatus further includes a generation unit, configured to obtain destination addresses of all packets in the unicast packet set, and generate a first multicast routing entry, where a source address of the first multicast routing entry is an address of the first multicast router, and the destination address group includes all the destination addresses.

In one embodiment, the multicast forwarding apparatus further includes a processing unit, configured to: modify the received unicast packet with the multicast identifier based on the first multicast routing entry, to obtain a modified unicast packet, where a source address of the modified unicast packet is the address of the first multicast router, and a destination address of the modified unicast packet is a destination address in the destination address group and in the first multicast routing entry; and send the modified unicast packet to the destination devices corresponding to the destination address group.

In one embodiment, the listening unit is further configured to obtain, through listening, a first message sent by the upstream multicast router, where the first message carries the multicast identifier and a first target address, and is used to indicate that a destination device corresponding to the first target address stops receiving a unicast packet with the multicast identifier. The determining unit is further configured to search for the first multicast routing entry corresponding to the multicast identifier, and determine that the first target address belongs to the destination address group. The processing unit is further configured to remove the first target address from the first multicast routing entry, and stop sending the unicast packet with the multicast identifier to the destination device corresponding to the first target address.

In one embodiment, the sending unit is further configured to: when the determining unit determines that a destination address in the first multicast routing entry from which the first target address is removed is empty, instruct the upstream multicast router to stop sending the unicast packet with the multicast identifier to the sending unit.

According to a fourth aspect, an embodiment of this application further provides a multicast forwarding apparatus, and the apparatus has functions of implementing behavior of a terminal in the method example of the foregoing second aspect. The functions may be implemented by hardware, or may be implemented by hardware by executing corresponding software. The hardware or the software includes one or more modules corresponding to the functions. The apparatus includes a receiving unit, a processing unit, and a second multicast router of a method side corresponding to the apparatus. The receiving unit is configured to receive a prune message from a downstream multicast router, where the prune message includes a destination address group determined by the downstream multicast router from all unicast packets in a unicast packet set, the unicast packet set is a set of unicast packets that are obtained by the downstream multicast router by listening to a plurality of unicast packets passing through the downstream multicast router, that are from the second multicast router, and that belong to a same unicast stream, a unicast packet in the unicast stream carries a multicast identifier, and the multicast identifier indicates that the unicast packets in the unicast stream are from a same data source server and are to be sent to destination devices that belong to a same multicast group. The processing unit is configured to stop, based on the prune message, sending the unicast packets with the multicast identifier to the destination devices corresponding to the destination address group. The sending unit is configured to send the to-be-sent unicast packets with the multicast identifier to the downstream multicast router.

In one embodiment, the receiving unit is further configured to receive a registration request from the data source server, where the registration request carries IP four-tuple information of a User Datagram Protocol (UDP) session. The processing unit is further configured to allocate a multicast group identifier to the UDP session based on the registration request. The sending unit is further configured to send a registration request response message to the data source server, where the response message carries the multicast group identifier. The receiving unit is further configured to receive a unicast packet sent by the data source server, where a header of the unicast packet carries the multicast identifier, and the multicast identifier is generated by the data source server based on an address of the data source server and the multicast group identifier.

In one embodiment, the receiving unit is configured to receive an on-demand request from a first client, where the on-demand request is used to request to subscribe to the UDP session. The forwarding apparatus further includes a generation unit. The generation unit is configured to generate a second multicast routing entry, where a source address of the second multicast routing entry is an address of the second multicast router, and a destination address of the second multicast routing entry is an address of the first client.

In one embodiment, the forwarding apparatus further includes the processing unit, configured to modify the received unicast packet with the multicast identifier based on the second multicast routing entry, to obtain a modified unicast packet, where a source address of the modified unicast packet is the address of the second multicast router, and a destination address of the modified unicast packet is the address of the first client. The sending unit is configured to send the modified unicast packet with the multicast identifier to the first client.

In one embodiment, the receiving unit is configured to receive an on-demand stop request sent by the first client, where the on-demand stop request is used to request to stop subscribing to the UDP session. The processing unit is further configured to: search for the second multicast routing entry corresponding to the multicast identifier; determine that the address of the first client is included in the destination address of the second multicast routing entry; remove the address of the first client from the second multicast routing entry; and stop sending the unicast packet with the multicast identifier to a destination device corresponding to the address of the first client.

In one embodiment, the processing unit is further configured to search for the second multicast routing entry corresponding to the multicast identifier; determine that the address of the first client is not included in the destination address of the second multicast routing entry; and generate a first message based on the second multicast routing entry, where a source address of the first message is the address of the second multicast router, a destination address of the first message is the address of the first client, and the first message carries the multicast identifier, and is used to notify the downstream multicast router that a destination device corresponding to the first target address stops receiving a unicast packet with the multicast identifier. The sending unit is configured to send the first message to the first client, so that the downstream multicast router stops, after obtaining the first message through listening, sending the unicast packet with the multicast identifier to the first client.

According to a fifth aspect, an embodiment of this application further provides a multicast router, and the multicast router has functions of implementing behavior of a multicast router in the method example of the first aspect or the second aspect. The functions may be implemented by hardware. A structure of the terminal includes a communications interface, a processor, and a memory, and the processor invokes an instruction stored in the memory, to perform the foregoing method.

According to a sixth aspect, an embodiment of this application further provides a computer storage medium, and the storage medium stores a software program. When being read and executed by one or more processors, the software program may implement the method provided in the first aspect or any embodiments of the first aspect.

According to a seventh aspect, this application further provides a computer program product that includes an instruction. When the computer program product runs on a computer, the computer is enabled to perform the foregoing aspects or various embodiments.

Compared with conventional IP multicast, in the multicast forwarding method provided in the embodiments of this application, a packet whose unicast address is a destination address may pass through a unicast network, and carries a multicast identifier, so that the multicast router may identify the packet. Therefore, the multicast function can be implemented in the network when some devices support multicast. In addition, some same unicast streams may be combined when the multicast function is implemented, thereby reducing network bandwidth consumption.

BRIEF DESCRIPTION OF DRAWINGS

FIG. 2A, FIG. 2B, and FIG. 2C are an interaction diagram of Scenario 1 of a multicast forwarding method according to an embodiment of this application;

FIG. 3A and FIG. 3B are an interaction diagram of Scenario 2 of a multicast forwarding method according to an embodiment of this application;

DESCRIPTION OF EMBODIMENTS

The following further describes this application in detail with reference to the accompanying drawings.

Figure 1:
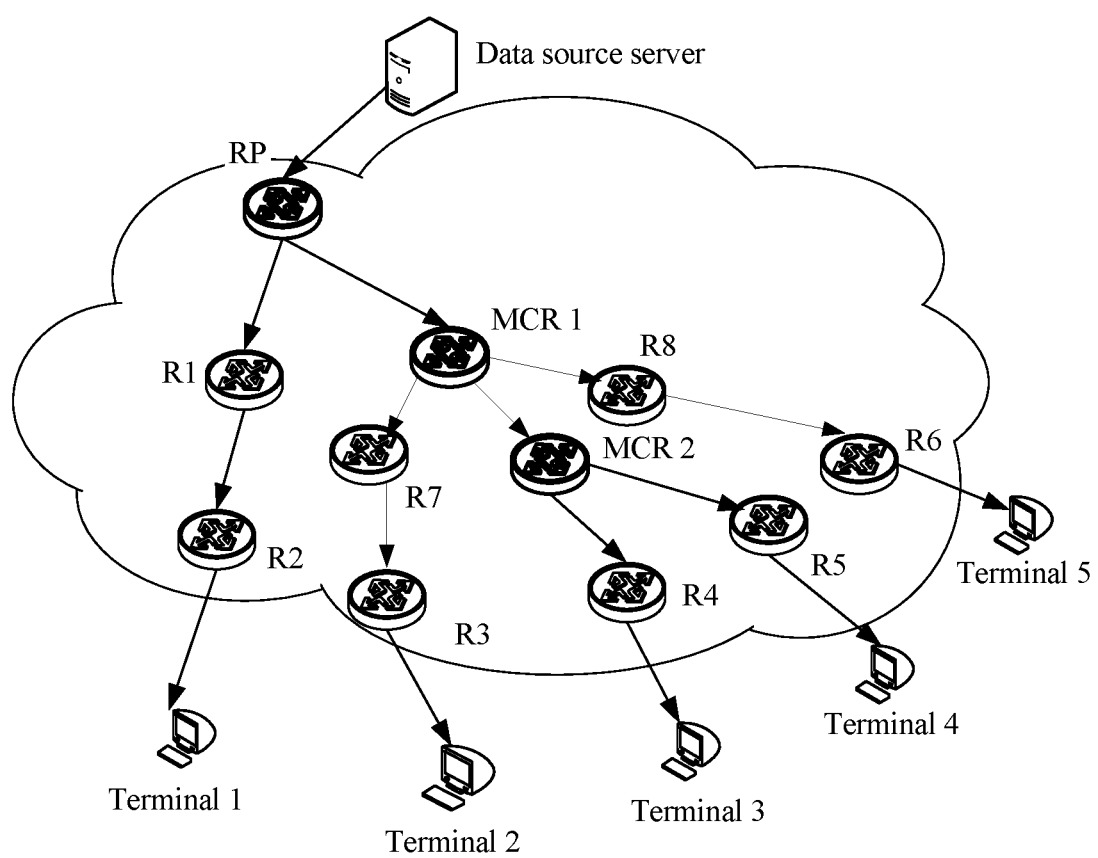
FIG. 1 is an architectural diagram of a communications system according to an embodiment of this application.

A multicast forwarding method in this application is applicable to various communications systems. FIG. 1 is a schematic diagram of one of the communications systems to which this application is applicable. The communications system includes a data source server, a rendezvous point (RP), a multicast router (MCR) 1, an MCR 2, an R1 to an R8, and a terminal 1 to a terminal 5.

The RP, the MCR 1, and the MCR 2 are introduced multicast routers that support multicast in an embodiment of this application. The R1 to the R8 are common routers, and do not support a multicast function. The terminal 1 to the terminal 5 may be computer devices, various mobile terminal devices, or the like. It should be noted that the RP is a special multicast router, and is further responsible for allocating a multicast group identifier, interacting with a client, and the like in addition to having the multicast function. In addition, the MCR 1 and the MCR 2 are multicast routers that support the multicast function, and are responsible for listening to and identifying unicast streams that can be aggregated, and aggregating these unicast streams.

Considering an existing IP multicast disadvantage that all routers in a network need to support the PIM-SM protocol and unicast disadvantages of a network bandwidth waste and low transmission efficiency, functions of some routers are upgraded based on an existing unicast network architecture in this embodiment of this application, so that the upgraded routers have the multicast function. The multicast function indicates that a multicast source sends information only once, a multicast router establishes a tree-like route by using a multicast routing protocol, and the transmitted information starts to be copied and distributed at a branch away from the multicast source as far as possible. In a multicast manner, a sender of information is referred to as a "multicast source", a receiver of information is referred to as a "multicast group" of the information, and all routers supporting multicast information transmission are referred to as "multicast routers". Receivers joining a same multicast group may be widely distributed in any location in the network. In other words, the "multicast group" is not geographically limited. It should be noted that a plurality of multicast sources may simultaneously send information to a same multicast group. It is assumed that only a terminal B, a terminal D, and a terminal E need same information. When the multicast manner is used, these terminals may join a same multicast group. The multicast source needs to send only one piece of information to an upstream multicast router, and each downstream multicast router in the network copies and forwards the information based on distribution of all the members in the multicast group. Finally, the information is accurately distributed to the terminal B, the terminal D, and the terminal E.

It can be learned from FIG. 1 that the communications system provided in this embodiment of this application improves only the router RP, the router MCR 1, and the router MCR 2. The improved RP, MCR 1, and MCR 2 have the multicast function. None of the common routers R1 to R8 participates in a multicast signaling process. Therefore, compared with IP multicast, the communications system provided in this embodiment of this application does not need to deploy multicast routers on the entire network. The RP, the MCR 1, and the MCR 2 having the multicast function do not use addresses of multicast groups in which the terminals are located as destination addresses. Instead, the RP, the MCR 1, and the MCR 2 having the multicast function mark a multicast packet by using a multicast identifier formed by an address of the data source server and a multicast group identifier.

Because the data source server inserts a multicast identifier into a packet, a multicast router on a branch tree generates a unicast packet set by listening to a unicast packet passing through the multicast router, and each unicast packet set includes unicast packets that are from a same multicast source and that carry a same multicast identifier. Once the multicast router MCR 2 on the branch tree detects that destination addresses (namely, the terminal 3 and the terminal 4) of unicast packets in the unicast packet set are different, a plurality of same unicast streams corresponding to different destination addresses are combined. In other words, the upstream multicast router MCR 2 is instructed to no longer send the plurality of same unicast streams but send only one unicast stream to the multicast router MCR 1, and the multicast router MCR 2 distributes the unicast stream to destination devices (namely, the terminal 3 and the terminal 4) corresponding to the different destination addresses. In this way, a packet whose unicast address is a destination address may pass through a unicast network, and the multicast identifier needs to be identified only by the multicast router, so that the multicast function can be implemented in the network when some devices support multicast. In addition, some same unicast streams may be combined when the multicast function is implemented, thereby reducing network bandwidth consumption.

In this embodiment of this application, a process of the multicast forwarding method is further described in detail with reference to the communications system shown in FIG. 1. There is an enabling sequence of multicast routers in the communications system shown in FIG. 1. In other words, the multicast routers may have the multicast function at different times. Therefore, the embodiments of this application are separately described in the following three scenarios.

Scenario 1

Figure 2A:
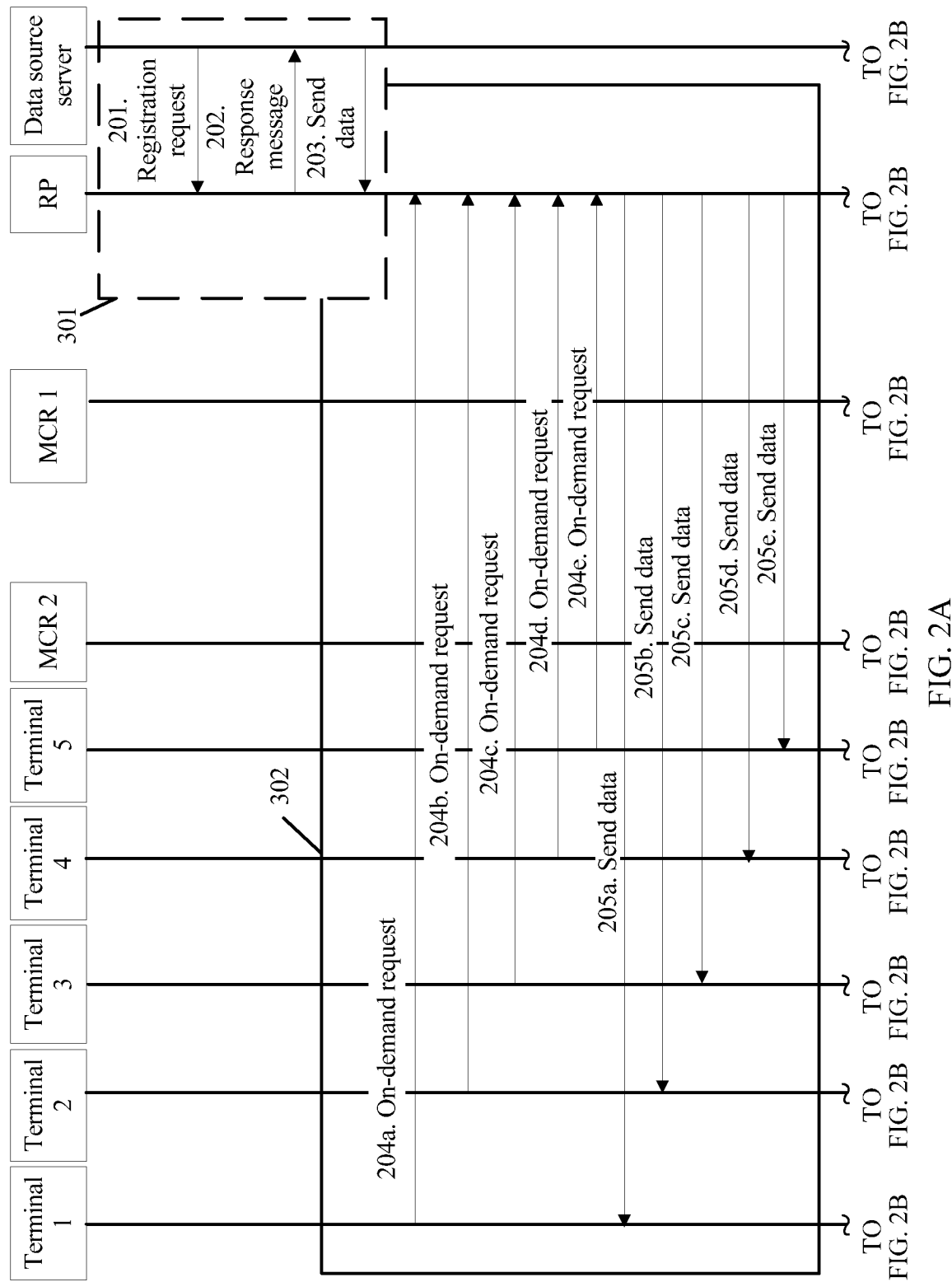
Figure 2B:
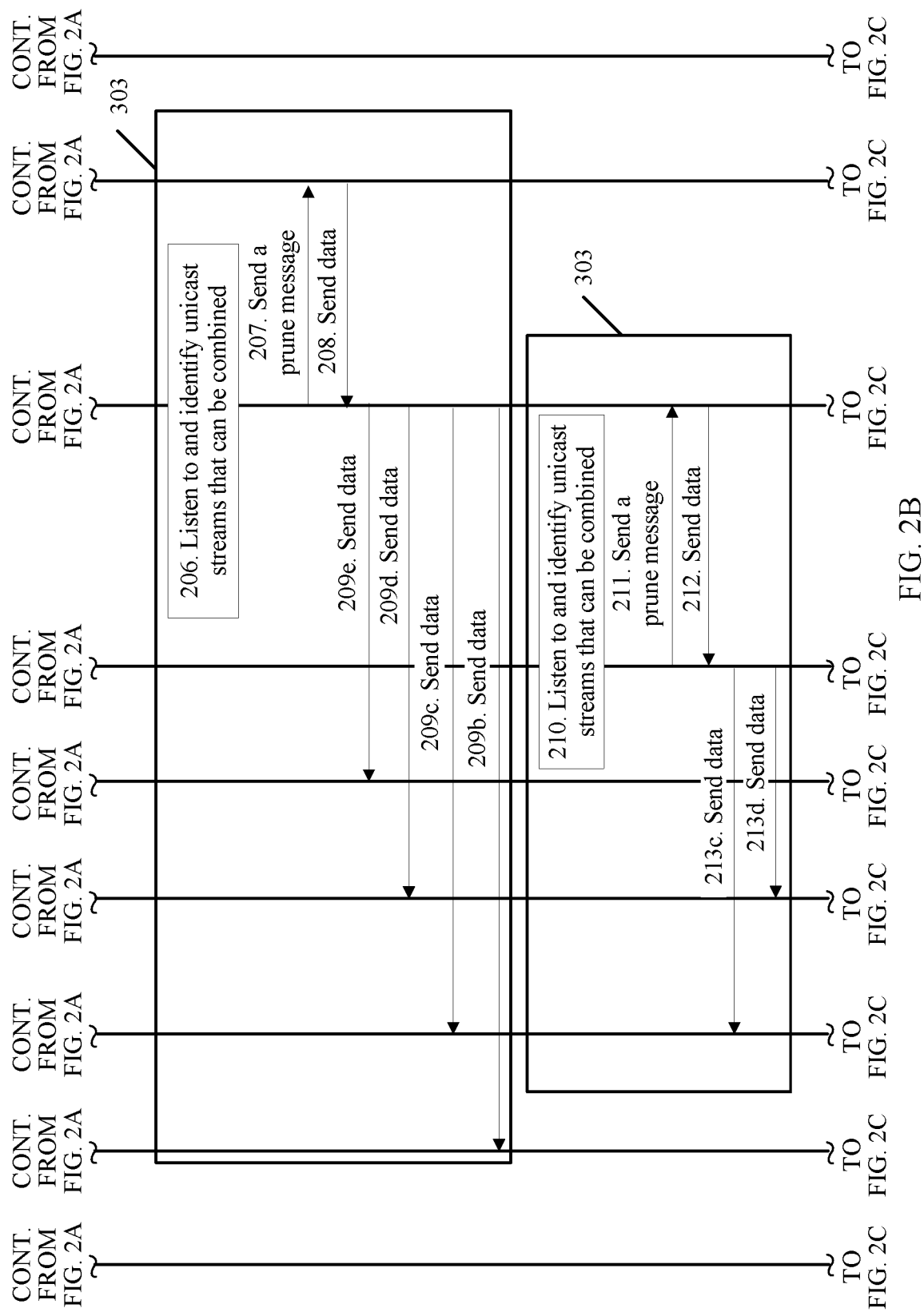

As shown in FIG. 2A, FIG. 2B, and FIG. 2C, a main procedure includes: a registration procedure A, an on-demand procedure B, a combination procedure C, and an on-demand stop procedure D.

The registration procedure A mainly includes operation 201 to operation 203 in FIG. 2A. Content is as follows:

Operation 201: A data source server sends a registration request to a multicast router, where IP four-tuple (a source address, a destination address, a source port number, and a destination port number) information of a UDP session is carried during registration.

Operation 202: After receiving the registration request of the data source server, the RP allocates a multicast group identifier to the UDP session based on the IP four-tuple of the UDP session in the registration request, and records a mapping relationship between the IP four-tuple of the UDP session and the multicast group identifier. In addition, the RP sends a registration request response message to the data source server, and the response message carries the multicast group identifier.

Operation 203: After receiving the response message of the multicast router, the data source server forms a multicast identifier by using the multicast group identifier allocated by the RP and an address of the data source server, inserts the multicast identifier into a header of a unicast packet, and then sends a modified packet to the RP. For example, if the address of the data source server is 10.0.0.2, and the multicast group identifier allocated by the RP to the UDP session is 1, the multicast identifier generated by the data source server is (10.0.0.2::1).

The on-demand procedure B mainly includes operation 204a to operation 205e in FIG. 2A. Content is as follows:

Operation 204a to operation 204e: A terminal 1 to a terminal 5 send on-demand requests to the RP, where the on-demand requests carry a group identifier of a multicast group in which the terminal 1 to the terminal 5 are located.

Operation 205a to operation 205e: After receiving the on-demand requests of the terminals, the RP queries, based on the multicast group identifiers of the terminals in the on-demand requests, the pre-established mapping relationship between the IP four-tuple of the UDP session and the multicast group identifier, and determines the corresponding UDP session. For example, the RP receives the on-demand request of the terminal 1, a multicast group identifier of the terminal in the on-demand request is 1, and the RP determines that the data source server of the UDP session is 10.0.0.2. Further, the RP adds an address of the terminal 1 to a multicast routing entry 1 (for example, as shown in Table 1). A source address in the multicast routing entry 1 is an address of the RP, and a destination address is the address of the terminal 1. The RP modifies, based on the multicast routing entry 1, a packet in the UDP session into a unicast packet whose source address is the RP and whose destination address is the address of the terminal 1, sends the unicast packet, and adds the multicast identifier to the unicast packet.

TABLE 1

| Multicast identifier | Source address | Destination address |
| --- | --- | --- |
| (10.0.0.2::1) | Address of the RP | Address of the terminal 1 |
| | | Address of the terminal 2 |
| | | Address of the terminal 3 |
| | | Address of the terminal 4 |
| | | Address of the terminal 5 |

The combination procedure C is mainly as follows: In FIG. 2B, the MCR 1 aggregates unicast streams sent by the RP to the terminal 2 to the terminal 5 (refer to operation 206 to operation 209e), and the MCR 2 aggregates unicast streams sent by the MCR 1 to the terminal 3 and the terminal 4 (refer to operation 210 to operation 213d). Content is as follows.

Operation 206: An MCR 1 and an MCR 2 listen to unicast packets passing through the MCR 1 and the MCR 2, and obtain multicast identifiers of the unicast packets obtained through listening and source address information in the unicast packets.

Operation 207a: The MCR 1 determines that there are n unicast packets whose source addresses are an address of the RP and that all the n unicast packets have a same multicast identifier (10.0.0.2::1); combines then unicast packets into one unicast packet set; and determines addresses of four terminals (the terminal 2 to the terminal 5) in the unicast packet set. Therefore, the MCR 1 sends a prune message to the upstream RP, where the prune message carries a destination address group (including the addresses of the terminal 2 to the terminal 5) determined from all the unicast packets in the unicast packet set. In addition, the MCR 1 generates a multicast routing entry 2 (for example, as shown in Table 2). A source address in the multicast routing entry 2 is an address of the MCR 1, and a destination address is the addresses of the terminal 2 to the terminal 5.

TABLE 2

| Multicast identifier | Source address | Destination address |
|---|---|---|
| (10.0.0.2::1) | Address of the MCR 1 | Address of the terminal 2 |
| | | Address of the terminal 3 |
| | | Address of the terminal 4 |
| | | Address of the terminal 5 |

Operation 207b: The MCR 2 also determines that there are k unicast packets whose source addresses are the address of the RP and that all the k unicast packets have the same multicast identifier (10.0.0.2::1); combines the k unicast packets into one unicast packet set; and determines addresses of two terminals (the terminal 3 and the terminal 4) in the unicast packet set. Therefore, the MCR 2 sends a prune message to the upstream RP. It should be noted that, because the communications system in FIG. 1 has a tree-like structure of a branch tree, in a time sequence, the MCR 1 obtains a unicast packet through listening before the MCR 2, and therefore the MCR 1 sends the prune message to the RP before the MCR 2. Therefore, the RP first receives the prune message sent by the MCR 1.

Operation 208: Because the prune message is used to instruct the RP to stop sending unicast packets with the multicast identifier to destination devices (the terminal 2 to the terminal 5) corresponding to the destination address group, and send the to-be-sent unicast packets with the multicast identifier to the MCR 1, after receiving the prune message sent by the MCR 1, the RP finds the corresponding multicast routing table 1 by using the multicast identifier, modifies the multicast routing entry 1, replaces the addresses of the terminal 2 to the terminal 5 with the address of the MCR 1, then combines a plurality of unicast streams to be sent to the terminal 2 to the terminal 5 into one unicast stream, and sends the unicast stream to the MCR 1. Table 3 shows a multicast routing entry 1 obtained after modification.

TABLE 3

| Multicast identifier | Source address | Destination address |
|---|---|---|
| (0.0.0.2::1) | Address of the RP | Address of the terminal 1 |
| | | Address of the MCR 1 |

Then, because the RP also receives the prune message of the MCR 2, and the multicast routing entry 1 (refer to Table 3) of the RP no longer includes the destination addresses of the terminal 3 and the terminal 4, the RP does not respond to the prune message.

Operation 209b to operation 209e: After receiving a unicast packet of the combined unicast stream sent by the RP, the MCR 1 copies and distributes the received unicast packet of the unicast stream to the terminal 2 to the terminal 5 based on the multicast routing entry 2 in Table 2.

Operation 210: The MCR 2 listens to a unicast packet passing through the MCR 2, and obtains a multicast identifier of the unicast packet obtained through listening and source address information in the unicast packet.

Operation 211: The MCR 2 determines that there are m unicast packets whose source addresses are the address of the MCR 1 and that all the m unicast packets have the same multicast identifier (10.0.0.2::1); combines the m unicast packets into one unicast packet set; and determines addresses of two terminals (the terminal 3 and the terminal 4) in the unicast packet set. Therefore, the MCR 2 sends a prune message to the upstream MCR 1, where the prune message carries a destination address group (including the addresses of the terminal 3 and the terminal 4) determined from all the unicast packets in the unicast packet set. In addition, the MCR 2 generates a multicast routing entry 3 (for example, as shown in Table 4). A source address in the multicast routing entry 3 is an address of the MCR 2, and a destination address is the addresses of the terminal 3 and the terminal 4.

TABLE 4

| Multicast identifier | Source address | Destination address |
|---|---|---|
| (10.0.0.2::1) | Address of the MCR 2 | Address of the terminal 3 |
| | | Address of the terminal 4 |

Operation 212: Because the prune message is used to instruct the MCR 1 to stop sending unicast packets with the multicast identifier to destination devices (the terminal 3 and the terminal 4) corresponding to the destination address group, and send the to-be-sent unicast packets with the multicast identifier to the MCR 2, after receiving the prune message, the MCR 1 finds the corresponding multicast routing table 2 by using the multicast identifier, modifies the multicast routing entry 2, replaces the addresses of the terminal 3 and the terminal 4 with the address of the MCR 2, then combines a plurality of unicast streams to be sent to the terminal 3 and the terminal 4 into one unicast stream, and sends the unicast stream to the MCR 2. Table 5 shows a multicast routing entry 2 obtained after modification.

TABLE 5

| Multicast identifier | Source address | Destination address |
|---|---|---|
| (10.0.0.2::1) | Address of the MCR 1 | Address of the terminal 2 |
| | | Address of the MCR 2 |
| | | Address of the terminal 5 |

Operation 213c to operation 213d: After receiving a unicast packet of the combined unicast stream sent by the MCR 1, the MCR 2 copies and distributes the received unicast packet of the unicast stream to the terminal 3 and the terminal 4 based on the multicast routing entry 3 in Table 4.

The on-demand stop procedure D mainly includes operation 214 to operation 216 in FIG. 2C. Content is as follows:

Operation 214: The terminal sends an on-demand stop request to the RP, where the on-demand stop request carries the multicast identifier and a first target address, and is used to indicate that a destination device corresponding to the first target address stops receiving a unicast packet with the multicast identifier. For example, the terminal 2 sends the on-demand stop request to the RP, and the on-demand stop request carries an address of the terminal 2 and the multicast identifier (10.0.0.2::1).

Operation 215: The RP searches for the multicast routing entry 1 corresponding to the multicast identifier, determines that the address of the terminal 2 is not included in a destination address list of the multicast routing entry 1, and notifies, by using a first message, the downstream multicast router that the terminal 2 stops receiving a unicast packet with the multicast identifier, where a source address of the first message is the address of the RP, and a destination address is addresses of the terminal 1 to the terminal 5.

Operation 216: The MCR 1 obtains the first message during listening, finds a corresponding multicast identifier based on the multicast identifier in the first message, then determines the multicast routing entry 2 through searching based on the multicast identifier, modifies the multicast routing entry 2, and removes the address of the terminal 2 from the multicast routing entry 2. Table 6 shows a multicast routing entry 2 obtained after modification.

TABLE 6

| Multicast identifier | Source address | Destination address |
| --- | --- | --- |
| (10.0.0.2::1) | Address of the MCR 1 | Address of the MCR 2<br>Address of the terminal 5 |

Assuming that the terminal 1 sends the on-demand stop request to the RP in operation 214, operation 215 and operation 216 are as follows: The RP searches for the multicast routing entry 1 corresponding to the multicast identifier, determines that the address of the terminal 2 is included in the destination address list of the multicast routing entry 1, modifies the multicast routing entry 1, and removes the address of the terminal 1 from the multicast routing entry 1. Table 7 shows a multicast routing entry 1 obtained after modification.

TABLE 7

| Multicast identifier | Source address | Destination address |
| --- | --- | --- |
| (10.0.0.2::1) | Address of the RP | Address of the MCR 1 |

It can be learned from the procedures described in FIG. 2A, FIG. 2B, and FIG. 2C that, in this embodiment of this application, a multicast transmission service function is implemented by deploying some multicast routes in a unicast network, so that some multicast functions can be implemented, network bandwidth occupation can be reduced, and the multicast router may further count added or removed terminals by using a multicast routing entry, to manage and charge the terminal.

It should be noted that, assuming that the prune message sent by the MCR 1 in operation 207a is lost and subsequently resent, subsequent execution operations are different. Details are as follows:

Operation 208: Because the prune message is used to instruct the RP to stop sending unicast packets with the multicast identifier to destination devices (the terminal 3 and the terminal 4) corresponding to the destination address group, and send the to-be-sent unicast packets with the multicast identifier to the MCR 2, after receiving the prune message sent by the MCR 1, the RP finds the corresponding multicast routing table 1 by using the multicast identifier, modifies the multicast routing entry 1, replaces the addresses of the terminal 3 and the terminal 4 with the address of the MCR 2, then combines a plurality of unicast streams to be sent to the terminal 3 and the terminal 4 into one unicast stream, and sends the unicast stream to the MCR 2.

Then, because the RP also receives the prune message of the MCR 1, and the multicast routing entry 1 of the RP no longer includes the destination addresses of the terminal 3 and the terminal 4, the RP does not combine the two unicast streams. Instead, the RP only combines the addresses sent to the terminal 2, the terminal 5, and the MCR 1 into one unicast stream, and then sends the unicast stream to the MCR 1. After the MCR combines the unicast streams of the RP and before the MCR 1 completes combination, the MCR 2 follows the following principle: combining only packets whose source addresses are the upstream MCR 1.

Scenario 2

It is assumed that the MCR 2 is a common router at an initial deployment stage of the communications system in FIG. 1, and is subsequently upgraded to a multicast router due to a product requirement. In the combination procedure 303, operations performed when the MCR 2 in FIG. 1 is a common router are different from those performed when the MCR 2 is upgraded to a multicast router.

Figure 3A:
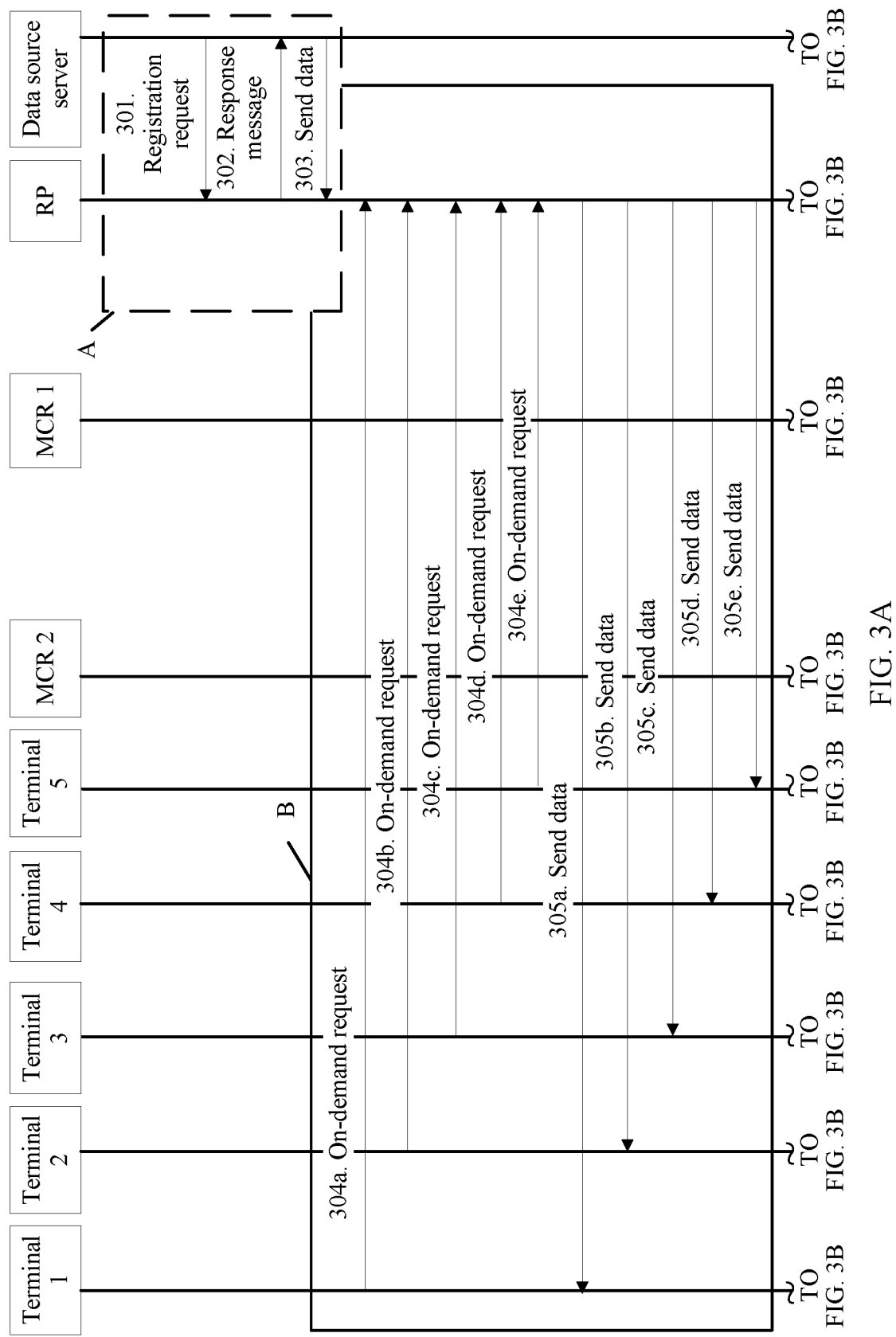

Case 1: As shown in FIG. 3A and FIG. 3B, when the MCR 2 is a common router, a packet forwarding process includes the following operations:

Operation 301 to operation 305e are consistent with operation 201 to operation 205e, and details are not described herein again.

Operation 306: The MCR 1 listens to a unicast packet passing through the MCR 1, and obtains a multicast identifier of the unicast packet obtained through listening and source address information in the unicast packet.

Operation 307a is consistent with operation 207a, and details are not described herein again.

Operation 308: Because the prune message is used to instruct the RP to stop sending unicast packets with the multicast identifier to destination devices (the terminal 2 to the terminal 5) corresponding to the destination address group, and send the to-be-sent unicast packets with the multicast identifier to the MCR 1, after receiving the prune message sent by the MCR 1, the RP finds the corresponding multicast routing entry 1 by using the multicast identifier, modifies the multicast routing entry 1, replaces the addresses of the terminal 2 to the terminal 5 with the address of the MCR 1, then combines a plurality of unicast streams to be sent to the terminal 2 to the terminal 5 into one unicast stream, and sends the unicast stream to the MCR 1. Table 3 shows the multicast routing entry 1 obtained after modification.

Operation 309b to operation 309e are consistent with operation 209b to operation 209e, and details are not described herein again.

Case 2: When the MCR 2 is upgraded to a multicast router, operations in a packet forwarding process are the same as operations in FIG. 2A, FIG. 2B, and FIG. 2C. A difference lies in that the MCR 2 and the MCR 1 do not simultaneously send a prune message to the RP. In other words, because the MCR 1 has combined unicast streams sent by the RP, there is no operation 307b. As shown in FIG. 3A and FIG. 3B, the MCR 2 performs the following operations:

Operation 310: The MCR 2 listens to a unicast packet passing through the MCR 2, and obtains a multicast identifier of the unicast packet obtained through listening and source address information in the unicast packet.

Operation 311 to operation 313d are consistent with operation 211 to operation 211d, and details are not described herein again.

Scenario 3

It is assumed that the MCR 1 is a common router at an initial deployment stage of the communications system in FIG. 1, and is subsequently upgraded to a multicast router due to a product requirement. In the combination procedure 303, operations performed when the MCR 1 in FIG. 1 is a common router are different from those performed when the MCR 1 is upgraded to a multicast router.

Figure 4A:
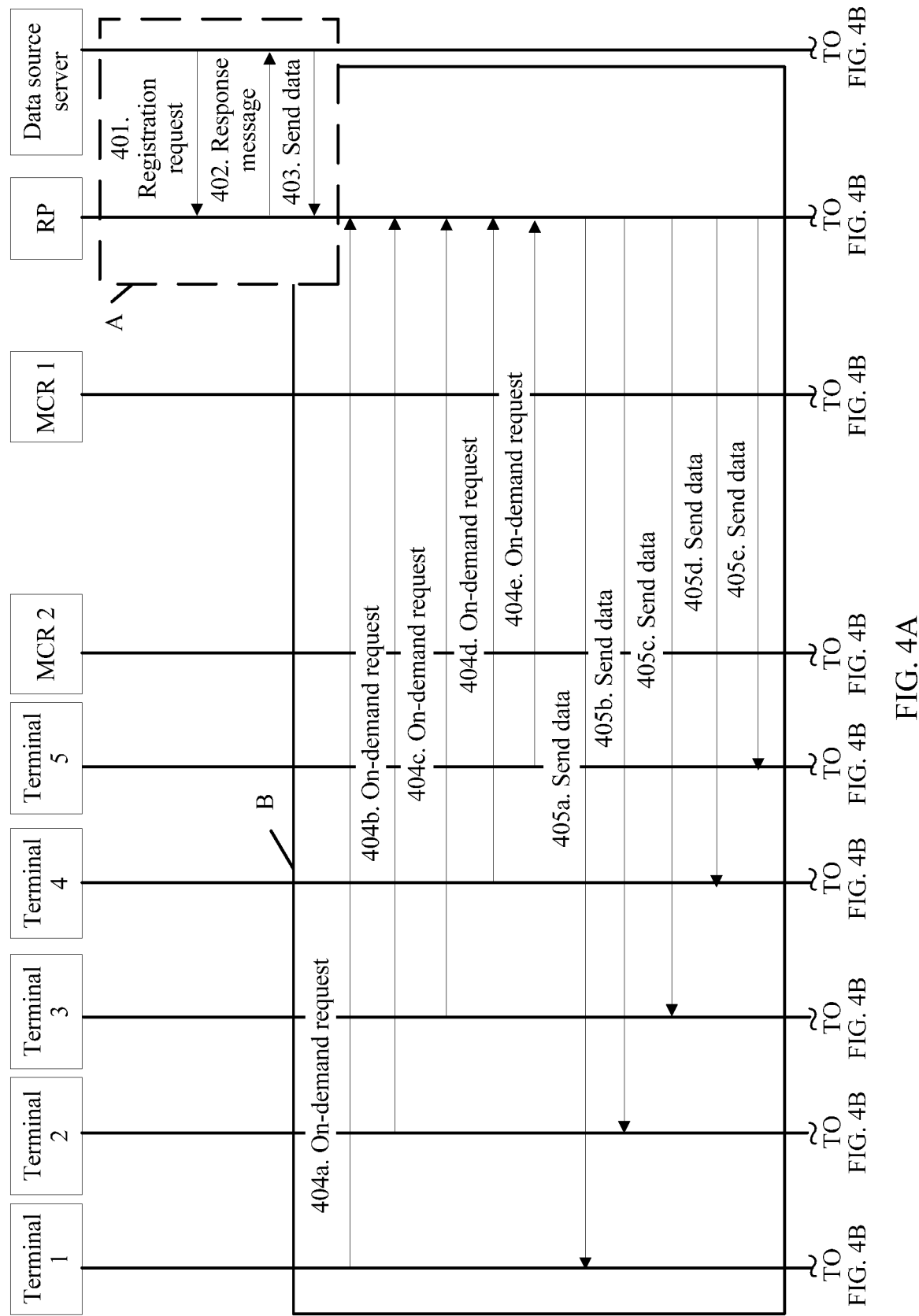
FIG. 4A and FIG. 4B are an interaction diagram of Scenario 3 of a multicast forwarding method according to an embodiment of this application.
Figure 4B:
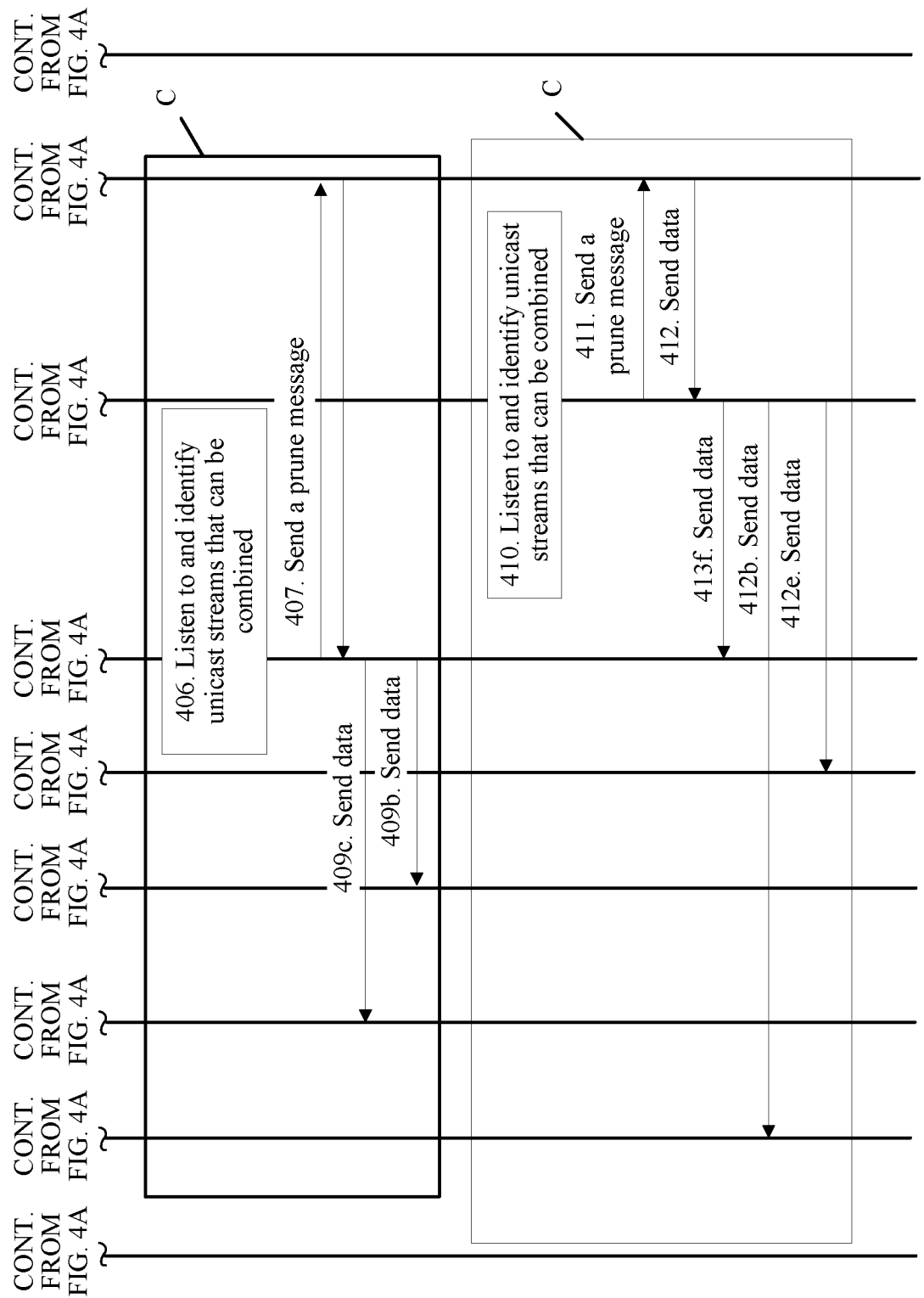

Case 1: As shown in FIG. 4A and FIG. 4B, when the MCR 1 is a common router, a packet forwarding process includes the following operations:

Operation 401 to operation 405e are consistent with operation 201 to operation 205e, and details are not described herein again.

Operation 406 is consistent with operation 210, and details are not described herein again.

Operation 407: The MCR 2 determines that there are m unicast packets whose source addresses are an address of the RP and that all the m unicast packets have a same multicast identifier (10.0.0.2::1); combines the m unicast packets into one unicast packet set; and determines addresses of two terminals (the terminal 3 and the terminal 4) in the unicast packet set. Therefore, the MCR 2 sends a prune message to the upstream RP, where the prune message carries a destination address group (including the addresses of the terminal 3 and the terminal 4) determined from all the unicast packets in the unicast packet set. In addition, the MCR 2 generates a multicast routing entry 3 (as shown in Table 4).

Operation 408: Because the prune message is used to instruct the RP to stop sending unicast packets with the multicast identifier to destination devices (the terminal 3 and the terminal 4) corresponding to the destination address group, and send the to-be-sent unicast packets with the multicast identifier to the MCR 2, after receiving the prune message, the RP finds the corresponding multicast routing table 2 by using the multicast identifier, modifies the multicast routing entry 1, replaces the addresses of the terminal 3 and the terminal 4 with the address of the MCR 2, then combines a plurality of unicast streams to be sent to the terminal 3 and the terminal 4 into one unicast stream, and sends the unicast stream to the MCR 2. Table 8 shows a multicast routing entry 1 obtained after modification.

TABLE 8

| Multicast identifier | Source address | Destination address |
| --- | --- | --- |
| (10.0.0.2::1) | Address of the RP | Address of the terminal 1<br>Address of the terminal 2<br>Address of the MCR 2<br>Address of the terminal 5 |

Case 2: When the MCR 1 is upgraded to a multicast router, operations in a packet forwarding process are the same as operations in FIG. 2A, FIG. 2B, and FIG. 2C. In addition to that the MCR 1 and the MCR 2 do not simultaneously send a prune message to the RP, a difference further lies in that, because the MCR 2 has combined unicast streams of the terminal 3 and the terminal 4, the MCR 1 sends a prune message to the RP only to request to combine unicast streams to be sent to the terminal 2, the terminal 5, and the MCR 1. As shown in FIG. 4A and FIG. 4B, operations are as follows.

Operation 410: The MCR 1 listens to a unicast packet passing through the MCR 1, and obtains a multicast identifier of the unicast packet obtained through listening and source address information in the unicast packet.

Operation 411: The MCR 1 determines that there are L unicast packets whose source addresses are an address of the RP and that all the L unicast packets have a same multicast identifier (10.0.0.2::1); combines the L unicast packets into one unicast packet set; and determines addresses of three terminals (the terminal 2, the MCR 2, and the terminal 5) from the unicast packet set. Therefore, the MCR 1 sends a prune message to the RP, where the prune message carries a destination address group (including the address of the terminal 2, the address of the MCR 2, and the address of the terminal 5) determined from all the unicast packets in the unicast packet set. In addition, the MCR 1 generates a multicast routing entry 2 (as shown in Table 9). A source address in the multicast routing entry 2 is an address of the MCR 1, and a destination address is the addresses of the terminal 2, the MCR 2, and the terminal 5.

TABLE 9

| Multicast identifier | Source address | Destination address |
| --- | --- | --- |
| (10.0.0.2::1) | Address of the MCR 1 | Address of the terminal 2<br>Address of the MCR 2<br>Address of the terminal 5 |

Operation 412b, operation 402e, and operation 402f: After receiving a unicast packet of the combined unicast stream sent by the RP, the MCR 1 copies and distributes the received unicast packet of the unicast stream to the terminal 3, the MCR 2, and the terminal 5 based on the multicast routing entry 2 in Table 9.

To describe the foregoing multicast forwarding method more vividly, in this embodiment of this application, the foregoing packet forwarding process is described with reference to a communications system of a relatively simple network architecture shown in FIG. 5, and the communications system in FIG. 5 includes a data source server, an RP, an MCR 1, an R1 to an R4, and a terminal 1 to a terminal 3 joining a same multicast group.

Figure 5:
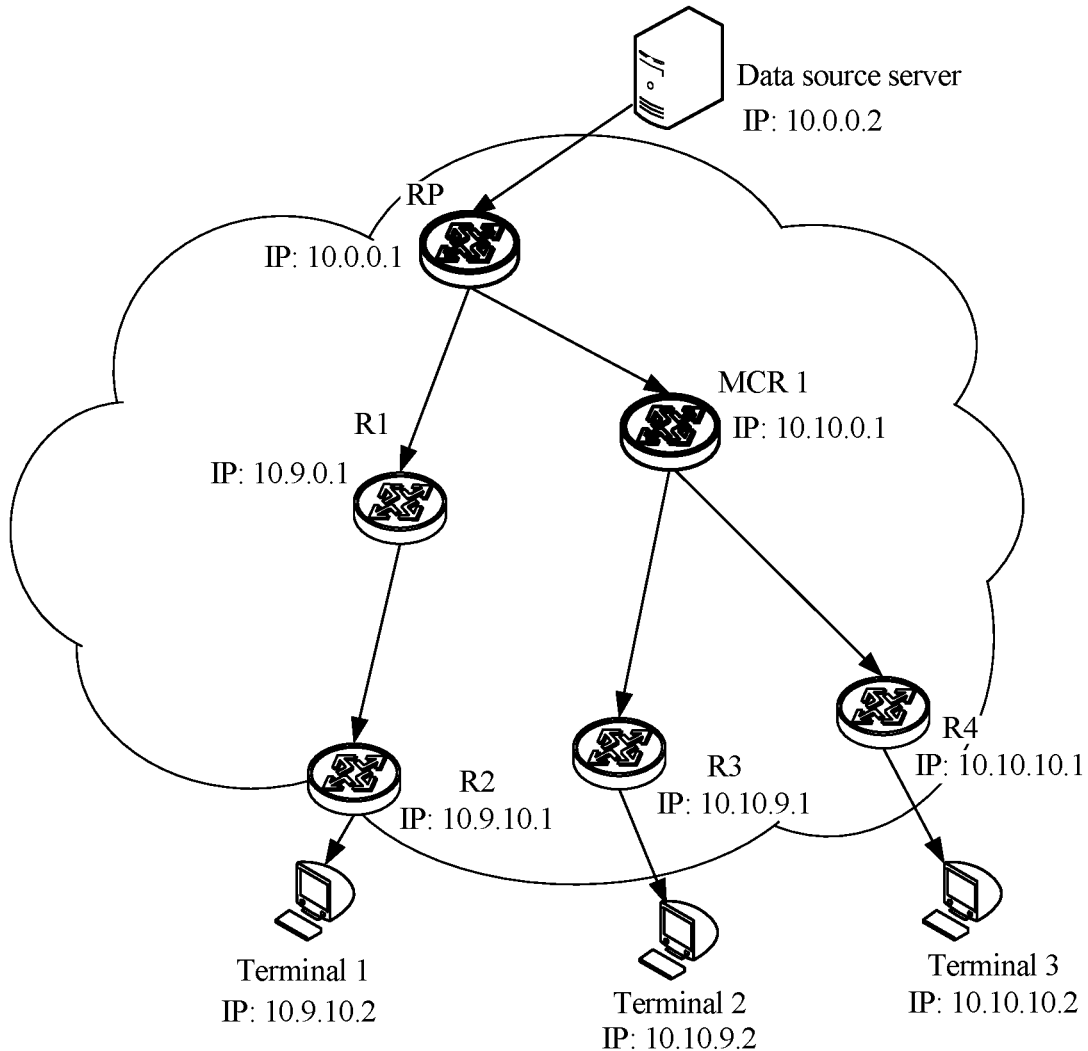
FIG. 5 is a diagram of an example architecture of a multicast forwarding method according to an embodiment of this application.

Table 10 shows addresses of network elements in FIG. 5.

TABLE 10

| Data source server | 10.0.0.2 |
| --- | --- |
| RP | 10.0.0.1 |
| MCR 1 | 10.10.0.1 |
| R1 | 10.9.0.1 |
| R2 | 10.9.10.1 |
| R3 | 10.10.9.1 |
| R4 | 10.10.10.1 |
| Terminal 1 | 10.9.10.2 |
| Terminal 2 | 10.10.9.2 |
| Terminal 3 | 10.10.10.2 |

A first procedure in FIG. 5: The data source server initiates a registration procedure to the RP, and detailed operations are as follows:

(A1) The data source server initiates establishment of a UDP session to the RP, where a source address of the UDP session is 10.0.0.2, a destination address is 10.0.0.1, a source port number is 112, and a destination port number is 211.

(A2) The data source server sends a registration request to the RP, where the registration request carries IP four-tuple information of the UDP session.

(A3) After receiving the registration request, the RP searches, by using the IP four-tuple information, a table of a pre-established mapping relationship between an IP four-tuple and a multicast group identifier. If no result is found and multicast group identifier resources are sufficient, the RP allocates a multicast group identifier ID 1 to the UDP session.

(A4) The RP generates a mapping relationship between the IP four-tuple and the multicast group identifier ID 1.

(A5) The RP sends a response message to the data source server, and generates a multicast identifier (10.0.0.2::1).

(A6) The RP establishes a multicast routing entry 1 corresponding to the multicast identifier (10.0.0.2::1), where a source address is an address (10.0.0.1) of the RP, and a destination address list is empty.

(A7) The data source server sends multicast content to the RP by using the UDP session, and inserts the multicast identifier (10.0.0.2::1) into a packet header.

A second procedure: The terminal 1 initiates an on-demand procedure to the RP. Detailed operations are as follows:

(B1) The RP receives an on-demand request sent by the terminal 1, and determines the IP four-tuple of the UDP session between the RP and the data source server based on multicast group identifier information in the on-demand request.

(B2) The RP obtains the multicast identifier (10.0.0.2::1) by using the IP four-tuple, finds the multicast routing entry 1 corresponding to the multicast identifier, and adds an address (10.9.10.2) of the terminal 1 to the destination list of the entry.

(B3) The RP records, in a context of the terminal 1, that a sending status of the terminal 1 is "direct sending", and copies one unicast stream to the terminal 1.

A third procedure: The terminal 2 initiates an on-demand procedure to the RP. Detailed operations are as follows:

(C1) The RP receives an on-demand request sent by the terminal 2, and determines the IP four-tuple of the UDP session between the RP and the data source server based on multicast group identifier information in the on-demand request.

(C2) The RP obtains the multicast identifier (10.0.0.2::1) by using the IP four-tuple, finds the multicast routing entry 1 corresponding to the multicast identifier, and adds an address (10.10.9.2) of the terminal 2 to the destination list of the entry.

(C3) The RP records, in a context of the terminal 2, that a sending status of the terminal 2 is "direct sending", and copies one unicast stream to the terminal 2.

A fourth procedure: The terminal 3 initiates an on-demand procedure to the RP. Detailed operations are as follows:

(D1) The RP receives a request sent by the terminal 3, and determines the IP four-tuple of the UDP session between the RP and the data source server based on multicast group identifier information in the on-demand request.

(D2) The RP obtains the multicast identifier (10.0.0.2::1) by using the IP four-tuple, finds the multicast routing entry 1 corresponding to the multicast identifier, and adds an address (10.10.10.2) of the terminal 3 to the destination list of the entry.

(D3) The RP records, in a context of the terminal 3, that a sending status of the terminal 3 is "direct sending", and copies one unicast stream to the terminal 3.

A fifth procedure: Combination procedure. Detailed operations are as follows:

(E1) The MCR 1 obtains, through listening by using a matching rule 1, a packet whose destination address is the address (10.10.9.2) of the terminal 2 and whose source address is the address (10.0.0.1) of the RP and that has the multicast identifier (10.0.0.2::1), and also obtains, through listening, a packet whose destination address is the address (10.10.10.2) of the terminal 3 and whose source address is the address (10.0.0.1) of the RP and that has the multicast identifier (10.0.0.2::1). The rule 1 means that packets that are sent by a same upstream multicast router and that have a same multicast identifier are obtained through matching, to obtain a unicast packet set.

(E2) Because more than one address in the destination list is copied, the MCR 1 sends a prune message to the RP, to instruct the RP to combine two unicast streams that have the same multicast identifier and that are sent to the terminal 2 and the terminal 3. A destination address of the prune message is the address (10.0.0.1) of the RP, a source address is the address (10.10.0.1) of the MCR 1, and the prune message carries a destination address list (10.10.9.2 and 10.10.10.2) and the multicast identifier (10.0.0.2::1).

(E3) The RP receives the prune message, finds the corresponding multicast routing entry 1 by using the multicast identifier (10.0.0.2::1), deletes (10.10.9.2) and (10.10.10.2) from the destination address list, adds the address (10.10.0.1) of the MCR 1 to the destination address list, and denotes sending modes of the terminal 2 and the terminal 3 as indirect sending.

(E4) The MCR 1 generates a multicast routing entry 2 corresponding to the multicast identifier (10.0.0.2::1), where a source address is the address (10.0.0.1) of the MCR 1, and the destination address list includes addresses of the terminal 2 and the terminal 3.

(E5) A rule 2 is added by the MCR and is delivered before the rule 1. A priority of the rule 2 is higher than a priority of the rule 1. Content of the rule 1 is mainly as follows: When a unicast packet that has the multicast identifier (10.0.0.2::1) and whose source address is the RP and whose destination address is the MCR is obtained through matching, the unicast packet is not added to the unicast packet set. It is designed to prevent a combined unicast stream from being matched again by using the rule 1.

A sixth procedure: On-demand stop procedure. Detailed operations are as follows:

(F1) The RP receives an on-demand stop request sent by the terminal 3, learns that a sending status of the terminal 3 is indirect sending, and constructs a stop-copy message, where a destination address of the stop-copy message is the address (10.10.10.2) of the terminal 3, and the stop-copy message carries the multicast identifier (10.0.0.2::1).

(F2) The MCR 1 obtains the stop-copy message through listening by using a rule 3, searches for the multicast routing entry 2 by using a multicast group ID in the message, checks a destination address of the terminal 3 in the destination list of the entry, deletes the destination address, and sends a response to the RP. Content of the rule 3 is used to match the stop-copy message of the RP.

It can be learned from the foregoing example that, the MCR 1 instructs the RP to combine a plurality of unicast streams, and the MCR 1 sends a combined unicast stream to each destination device, thereby effectively reducing network bandwidth.

Figure 6:
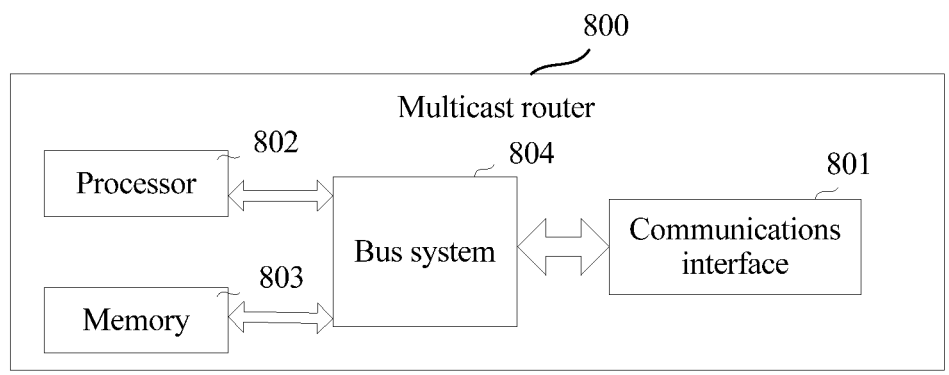
FIG. 6 is a schematic structural diagram of a multicast router according to an embodiment of this application.

FIG. 6 is a schematic structural diagram of a multicast router according to this application. The multicast router 800 includes a communications interface 801, a processor 802, a memory 803, and a bus system 804. The multicast router may be a first multicast router, or may be a second multicast router.

The memory 803 is configured to store a computer program, and may further store some data information and the like received by the multicast router. In one embodiment, the computer program may include program code, and the program code may include a computer operation instruction and the like. The memory 803 may be a random access memory (RAM), or may be a nonvolatile memory (NVM), for example, at least one magnetic disk storage. Only one memory is shown in the figure. Certainly, a plurality of memories may be provided as required. Alternatively, the memory 803 may be a memory in the processor 802.

For example, the memory 803 may store the following elements, executable modules, data structures, or the like, or a subset thereof, or an extension set thereof:

an operation instruction: including various operation instructions, and used to implement various operations; and an operating system, including various system programs, and used to implement various basic services and process a hardware-based task.

The processor 802 is configured to control an operation of the multicast router 800, and the processor 802 may be further referred to as a central processing unit (CPU).

The communications interface 801 is configured to perform processing such as information receiving and sending with another device connected to the multicast router 800.

In application, components of the multicast router 800 may be coupled together by using the bus system 804. In addition to a data bus, the bus system 804 may further include a power bus, a control bus, a status signal bus, and the like. However, for clarity of description, various buses are marked as the bus system 804 in the figure. For ease of illustration, FIG. 6 merely shows an example of the multicast router 800.

The method disclosed in the embodiments of this application may be applied to the processor 802, or may be implemented by the processor 802. The processor 802 may be an integrated circuit chip and has a signal processing capability. In an implementation process, each operation of the foregoing method may be completed by using an integrated logic circuit of hardware in the processor 802 or an instruction in a form of software. The processor 802 may be a general purpose processor, a digital signal processor (DSP), an application-specific integrated circuit (ASIC), a field programmable gate array (FPGA) or another programmable logic device, a discrete gate or transistor logic device, or a discrete hardware component. All methods, operations, and logical block diagrams disclosed in the embodiments of this application may be implemented or performed. The general purpose processor may be a microprocessor or the processor may be any conventional processor, or the like. Operations of the methods disclosed in the embodiments of this application may be directly performed and completed by a hardware decoding processor, or may be performed and completed by using a combination of hardware in the decoding processor and a software module. The software module may be located in a mature storage medium in the field, such as a random access memory, a flash memory, a read-only memory, a programmable read-only memory, an electrically-erasable programmable memory, or a register. The storage medium may be located in the memory 803, and the processor 802 may read information stored in the memory 803, and perform the foregoing method operations with reference to hardware.

When the multicast router in the foregoing embodiment is the first multicast router, the multicast router may send a prune message to an upstream router, and copy and distribute a combined unicast stream sent by the upstream router to a destination device. If the multicast router is the second multicast router, namely, an RP, the multicast router may communicate with a data source server, and allocate a multicast identifier to a UDP session. In addition, after receiving a prune message, the multicast router may combine a plurality of unicast streams, and send a combined unicast stream to the downstream multicast router. For implementation, refer to descriptions in the foregoing method embodiment, and details are not described herein again.

In conclusion, a unicast packet in this embodiment of this application is copied and distributed by using a multicast router deployed in a unicast network. This can reduce network bandwidth and server overheads compared with unicast transmission. In addition, in this embodiment of this application, multicast routers do not need to be deployed in an entire network, and only a limited quantity of existing routers need to be upgraded. In addition, the RP has contexts of all clients, and access and exit of all the clients may be managed by the RP. Compared with IP multicast, management convenience is improved. In addition, when the upgraded multicast router breaks down, only a unicast function provided by a common router needs to be recovered, and a communications network can still continually run.

A person skilled in the art should understand that the embodiments of the present application may be provided as a method, a system, or a computer program product. Therefore, the embodiments of the present application may use a form of hardware only embodiments, software only embodiments, or embodiments with a combination of software and hardware. In addition, the embodiments of the present application may use a form of a computer program product that is implemented on one or more computer-usable storage media (including but not limited to a magnetic disk storage, a CD-ROM, and an optical memory) that include computer usable program code.

The embodiments of the present application are described with reference to the flowcharts and/or block diagrams of the method, the device, system, and the computer program product according to the embodiments of the present application. It should be understood that computer program instructions may be used to implement each process and/or each block in the flowcharts and/or the block diagrams, and a combination of a process and/or a block in the flowcharts and/or the block diagrams. These computer program instructions may be provided for a general purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer readable memory that can instruct the computer or any other programmable data processing device to work in a manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and operations are performed on the computer or the another programmable device, thereby generating computer-implemented processing. Therefore, the instructions executed on the computer or the another programmable device provide operations for implementing a function in one or more processes in the flowcharts and/or in one or more blocks in the block diagrams.

Obviously, a person skilled in the art can make various modifications and variations to the embodiments of the present application without departing from the spirit and scope of this application. This application is intended to cover these modifications and variations to the embodiments of the present application provided that they fall within the scope of protection defined by the following claims and their equivalent technologies of this application.

What is claimed is:

1. A multicast forwarding method comprising:
listening to, by a first multicast router, a plurality of unicast packets passing through the first multicast router;
determining a set of unicast packets that are from a same upstream multicast router and that belong to a same unicast stream, wherein the unicast packets in the unicast stream carry a same multicast identifier, and the multicast identifier indicates that the unicast packets in the unicast stream are from a same data source server and are to be sent to destination devices that belong to a same multicast group;
when determining that destination addresses of at least two unicast packets in the unicast packet set are different, sending, by the first multicast router, a prune message to the upstream multicast router, wherein the prune message carries a destination address group determined from all the unicast packets in the unicast packet set, the prune message used to instruct the upstream multicast router to stop sending the unicast packets with the multicast identifier to the destination devices corresponding to the destination address group, and send the to-be-sent unicast packets with the multicast identifier to the first multicast router; and
sending, by the first multicast router, the received unicast packets with the multicast identifier to the destination devices corresponding to the destination address group.

2. The method according to claim 1, wherein the method further comprises:
when determining that destination addresses of at least two unicast packets in the unicast packet set are different, obtaining, by the first multicast router, destination addresses of all packets in the unicast packet set, and generating a first multicast routing entry, wherein a source address of the first multicast routing entry is an address of the first multicast router, and the destination address group comprises all the destination addresses; and
the sending, by the first multicast router, the received unicast packets with the multicast identifier to the destination devices corresponding to the destination address group comprises:
modifying, by the first multicast router, the received unicast packet with the multicast identifier based on the first multicast routing entry, to obtain a modified unicast packet, wherein a source address of the modified unicast packet is the address of the first multicast router, and a destination address of the modified unicast packet is a destination address in the destination address group and in the first multicast routing entry; and
sending, by the first multicast router, the modified unicast packet to the destination devices corresponding to the destination address group.

3. The method according to claim 2, further comprising:
obtaining, by the first multicast router through listening, a first message sent by the upstream multicast router, wherein the first message carries the multicast identifier and a first target address, and is used to indicate that a destination device corresponding to the first target address stops receiving a unicast packet with the multicast identifier;
searching, by the first multicast router, for the first multicast routing entry corresponding to the multicast identifier, and determining that the first target address belongs to the destination address group; and
removing, by the first multicast router, the first target address from the first multicast routing entry, and stopping sending the unicast packet with the multicast identifier to the destination device corresponding to the first target address.

4. The method according to claim 3, further comprising:
determining, by the first multicast router, that a destination address in the first multicast routing entry from which the first target address is removed is empty; and
instructing, by the first multicast router, the upstream multicast router to stop sending the unicast packet with the multicast identifier to the first multicast router.

5. A multicast forwarding method comprising:
receiving, by a second multicast router, a prune message from a downstream multicast router, wherein the prune message comprises a destination address group determined by the downstream multicast router from all unicast packets in a unicast packet set, the unicast packet set is a set of unicast packets that are obtained by the downstream multicast router by listening to a plurality of unicast packets passing through the downstream multicast router that are from the second multicast router, and that belong to a same unicast stream, a unicast packet in the unicast stream carries a multicast identifier, and the multicast identifier indicates that the unicast packets in the unicast stream are from a same data source server and are to be sent to destination devices that belong to a same multicast group; and
stopping, by the second multicast router based on the prune message, sending the unicast packets with the multicast identifier to the destination devices corresponding to the destination address group, and sending the to-be-sent unicast packets with the multicast identifier to the downstream multicast router.

6. The method according to claim 5, before the receiving, by a second multicast router, a prune message from a downstream multicast router, further comprising:
receiving, by the second multicast router, a registration request from the data source server, wherein the registration request carries IP four-tuple information of a User Datagram Protocol (UDP) session;
allocating, by the second multicast router, a multicast group identifier to the UDP session based on the registration request;
sending, by the second multicast router, a registration request response message to the data source server, wherein the response message carries the multicast group identifier; and
receiving, by the second multicast router, a unicast packet sent by the data source server, wherein a header of the unicast packet carries the multicast identifier, and the multicast identifier is generated by the data source server based on an address of the data source server and the multicast group identifier.

7. The method according to claim 6, further comprising:
receiving, by the second multicast router, an on-demand request from a first client, wherein the on-demand request is used to request to subscribe to the UDP session; and
generating, by the second multicast router, a second multicast routing entry, wherein a source address of the second multicast routing entry is an address of the second multicast router, and a destination address of the second multicast routing entry is an address of the first client; and
the sending, by the second multicast router, a to-be-sent unicast packet with the multicast identifier to the downstream multicast router comprises:
modifying, by the second multicast router, the received unicast packet with the multicast identifier based on the second multicast routing entry, to obtain a modified unicast packet, wherein a source address of the modified unicast packet is the address of the second multicast router, and a destination address of the modified unicast packet is the address of the first client; and
sending, by the second multicast router, the modified unicast packet with the multicast identifier to the first client.

8. The method according to claim 7, further comprising:
receiving, by the second multicast router, an on-demand stop request sent by the first client, wherein the on-demand stop request is used to request to stop subscribing to the UDP session;
searching, by the second multicast router, for the second multicast routing entry corresponding to the multicast identifier, and determining that the address of the first client is comprised in the destination address of the second multicast routing entry; and
removing, by the second multicast router, the address of the first client from the second multicast routing entry, and stopping sending the unicast packet with the multicast identifier to a destination device corresponding to the address of the first client.

9. The method according to claim 7, further comprising:
searching, by the second multicast router, for the second multicast routing entry corresponding to the multicast identifier, and determining that the address of the first client is not included in the destination address of the second multicast routing entry;
generating, by the second multicast router, a first message based on the second multicast routing entry, wherein a source address of the first message is the address of the second multicast router, a destination address of the first message is the address of the first client, and the first message carries the multicast identifier, and is used to notify the downstream multicast router that a destination device corresponding to the first target address stops receiving a unicast packet with the multicast identifier; and
sending, by the second multicast router, the first message to the first client, so that the downstream multicast router stops, after obtaining the first message through listening, sending the unicast packet with the multicast identifier to the first client.

10. A multicast router comprising:
a communications interface;
a processor; and
a memory, wherein
the processor executes an instruction stored in the memory, to perform operations comprising:
listening to, by using the communications interface, a plurality of unicast packets passing through the processor, and determining a set of unicast packets that are from a same upstream multicast router and that belong to a same unicast stream, wherein the unicast packets in the unicast stream carry a same multicast identifier, and the multicast identifier indicates that the unicast packets in the unicast stream are from a same data source server and are to be sent to destination devices that belong to a same multicast group;
when determining that destination addresses of at least two unicast packets in the unicast packet set are different, sending a prune message to the upstream multicast router by using the communications interface, wherein the prune message carries a destination address group determined from all the unicast packets in the unicast packet set, the prune message used to instruct the upstream multicast router to stop sending the unicast packets with the multicast identifier to the destination devices corresponding to the destination address group, and send the to-be-sent unicast packets with the multicast identifier to the first multicast router; and
sending, by using the communications interface, the received unicast packets with the multicast identifier to the destination devices corresponding to the destination address group.

11. The multicast router according to claim 10, wherein the processor is further configured to:
obtain destination addresses of all packets in the unicast packet set, and generate a first multicast routing entry, wherein a source address of the first multicast routing entry is an address of the first multicast router, and the destination address group comprises all the destination addresses;
modify the received unicast packet with the multicast identifier based on the first multicast routing entry, to obtain a modified unicast packet, wherein a source address of the modified unicast packet is the address of the first multicast router, and a destination address of the modified unicast packet is a destination address in the destination address group and in the first multicast routing entry; and
send, by using the communications interface, the modified unicast packet to the destination devices corresponding to the destination address group.

12. The multicast router according to claim 11, wherein the processor is further configured to:
obtain, through listening by using the communications interface, a first message sent by the upstream multicast router, wherein the first message carries the multicast identifier and a first target address, and is used to indicate that a destination device corresponding to the first target address stops receiving a unicast packet with the multicast identifier;
search for the first multicast routing entry corresponding to the multicast identifier, and determine that the first target address belongs to the destination address group; and
remove the first target address from the first multicast routing entry, and stop sending the unicast packet with the multicast identifier to the destination device corresponding to the first target address.

13. The multicast router according to claim 12, wherein the processor is further configured to:
determine that a destination address in the first multicast routing entry from which the first target address is removed is empty; and instruct, by using the communications interface, the upstream multicast router to stop sending the unicast packet with the multicast identifier to the processor.

\* \* \* \* \*